United States Patent Office

Re. 27,124
Reissued May 18, 1971

27,124
WOOD DRYING METHOD

Robert W. Erickson, St. Paul, Minn., assignor to The Regents of the University of Minnesota, Minneapolis, Minn.

No Drawing. Original No. 3,309,778, dated Mar. 21, 1967, Ser. No. 523,869, Feb. 1, 1966. Application for reissue Dec. 29, 1969, Ser. No. 888,180
Int. Cl. F26b *5/06*
U.S. Cl. 34—5 4 Claims

Matter enclosed in heavy brackets [ ] appears in the original patent but forms no part of this reissue specification; matter printed in italics indicates the additions made by reissue.

*ABSTRACT OF THE DISCLOSURE*

*A method of accelerating the drying rate of lumber, such as redwood, which is normally susceptible to damage if subjected to rapid drying at elevated temperatures. Such high moisture content lumber is subject to damage in the form of collapse and honeycombing and to shrinkage. It has been discovered that lumber may be upgraded and damage minimized when the lumber in green condition is pretreated by thorough freezing of its liquid fraction and then the pretreated lumber is dried rapidly by subjecting to conditions of low relative humidity and high temperature at least 30° F. above the critical temperature at which damage normally occurs, 110° to 120° F. in the case of redwood. Preferably at least a substantial portion of the pretreated lumber is permitted to thaw by returning to ambient temperature before rapid drying.*

This invention relates to a wood drying method and more particularly to a method for accelerating the drying rate of green lumber which is susceptible to damage if subjected to rapid artificial drying by first subjecting the lumber to freezing. The invention is of particular interest with respect to California redwood both because the process is very effective with redwood and the species is of great commercial importance. For this reason the invention is described with particular reference to redwood but it has equal application in the treatment of other green softwoods having relatively high moisture content and which are slow drying and in which damage has been demonstrated to occur if they are subjected to rapid drying. The method is also applicable to other woods which are susceptible to damage from drying. These woods are characterized by high moisture content and high extractive content and a relatively low vapor diffusion rate. Exemplary of such other woods are western red cedar, incense cedar, cypress, black walnut, madrone, tan oak, true mahoganies, Philippine mahogany, Eucalyptus species, etc.

Data published by the U.S. Department of Agriculture Forest Service in 1958 gives the annual conversion of redwood sawtimber into lumber at 980 million board feet. The greatest portion of this material has end use requirements that necessitate drying the rough sawn lumber down to a moisture content of 8 to 10 percent. Since redwood is a slow drying species, requiring the longest drying time of any commercial softwood species, this represents a major problem in the industry.

As early as 1925 studies were made which were concerned primarily with finding a profitable balance between the drying time required and the losses occuring from degrade due to drying defects. The large number of investigations since that time have focused basically upon this same objective.

If redwood lumber could be kiln dried green from the saw the total drying time could, of course, be reduced. The basic problem in this approach is once again that of obtaining a profitable balance of drying time and losses due to degrade of the stock. The principal problem in kiln drying green redwood lumber is "collapse," a drying defect in which the water saturated wood cells literally collapse. In severe cases of collapse the wood cells on the interior of the board are torn apart, resulting in the drying defect called "honeycomb." A honeycombed board is useless, as can be easily determined by simply cross-cutting it. The cross cut surface will reveal from one to several lenticular shaped ruptures, which will often run the entire length of the board. In less severe cases of collapse the surfaces of the board take on an irregular contour, and this generally requires additional removal of materials during surfacing in order to surface out the defect. Here again, the irregularities can be of sufficient depth to eliminate the board from any commercial use.

Collapse in redwood is extremely temperature dependent. Collapse may occur if the drying temperature is raised above the critical value, which ranges from 110° F. to 120° F., while the moisture content of the wood is still above 30 percent. Much of the redwood dried has an initial moisture content of from 150 to 200 percent, and a certain amount will even greatly exceed 200 percent. Once the outer surfaces of a board have reached an equilibrium with the drying conditions, water from the interior moving outward must subsequently diffuse through this increasingly deepening dried layer of wood surrounding the interior portions. The diffusion rate through this dried layer of wood is extremely temperature dependent, increasing greatly with an increase in the drying temperature. This cannot be taken advantage of, however, for increasing the temperature above 110° F. to 120° F. will cause that portion of collapse-susceptible boards still above 30% moisture content to collapse. Therefore, the drying rate is limited to that obtained with a diffusion rate corresponding to a maximum of 110° F. to 120° F. Once the moisture content at the very center of the board has dropped below 30% it is possible to increase the temperature, and thereby increase the diffusion rate. The extended periods during which kiln temperatures must be maintained at 110° F. to 120° F. or less makes the cost of kiln drying from the green condition prohibitive for the majority of redwood lumber.

Presently the drying practice of all large redwood mills is to segregate the lumber on the basis of drying characteristics, which are recognized by weight and appearance. Usually it is segregated into two classes—light and heavy. The light segregation is kiln dried to the desired moisture content in a comparatively short period of time. The heavy segregation is air dried to an average moisture content of from 30% to 50%. Even after air drying the initial kiln temperature must not exceed the critical temperature cited previously. Surveys show that the amount of redwood first air dried and then kiln dried represents between 51% and 75% of a mill's production. The air drying takes from 6 to 12 months and this is followed by 6 to 20 days of kiln drying. The wide range in kiln drying time is due to the variation in moisture content of lumber going into the kilns, and the fact that almost every mill uses a different kiln schedule.

Air drying followed by kiln drying keeps the required kiln capacity to a minimum but a large air drying yard is required and a huge capital investment in stored lumber is maintained. Insurance cost on the material stored in air drying yards is in itself quite significant. Even with a large inventory, however, mills cannot always be in a position to fill an order promptly. In other words, under existing methods, flexibility in response to changing market conditions leaves something to be desired.

In summary then, investigations pertaining to finding means for increasing the drying rate of redwood have been going on from the early 1900's up to the present. The most recent known work in this regard prior to the present invention was done by Resch and Ecklund at the University of California Forest Products Laboratory, and is published in Bulletin 803 of the California Agricultural Experiment Station entitled, "Accelerating the Drying of Redwood Lumber," July 1964.

The process of the present invention to be subsequently described in detail has at its purpose the desired effect of greatly increasing the drying rate of redwood and other wood species of high moisture content from the green condition without incurring any substantial losses in degrade directly attributable to the accelerated drying.

Basically the process consists of applying a freezing treatment to lumber in the green condition, and then rapidly drying the treated material under initial conditions of high temperature and low relative humidity with a marked reduction in the occurrence and amount of collapse or honeycomb, or, preferably, without any drying defects. At the same time, shrinkage due to drying is substantially reduced.

The salient feature of the present invention is that the lumber is first pretreated by thoroughly freezing it. This may be accomplished by subjecting the lumber to a temperature below about 15° F. (−10° C.) for a period of about eight hours. Preferably the lumber is subjected to a lower temperature between about +5° F. and −15° F. (−15° C. to −25° C.). Freezing may desirably be for a longer period of from about 2 to 3 days. The freezing duration required at a given temperature to obtain the optimum effect upon subsequent drying behavior is a function of many variable factors. Among these are variations in the size of the wood pieces as well as variation in moisture content, density and extractive content, all of which will affect the freezing rate. The principal requirement is thorough freezing of the liquid fraction present in the wood, which may be accomplished with many combinations of freezing temperature and freezing duration. For example, at −25° C. substantially equivalent results were obtained with respect to shrinking and drying defect with freezing duration of eight hours as with longer freezing duration at the same temperature. The lumber may be kiln dried immediately after freezing or after thawing at ambient or other conditions.

The pretreated green lumber is then dried at an elevated temperature and under low relative humidity conditions. The elevated drying temperature is substantially higher than the critical temperature range, preferably, for example, between 150° F. and 300° F. Because the rate at which moisture is diffused increases exponentially, rather than linearly, with increase in temperature, substantial savings are effected if the lumber is dried at a temperature of only 30° or 40° above the critical temperature range.

Redwood lumber is ordinarily dried to an average moisture content of from 8% to 10%. The time required for reducing the moisture to this level depends upon a number of factors including the initial moisture content of the lumber, the temperature and relative humidity employed, the tightness with which the lumber is stacked and with which the kiln is loaded, and the like. Heretofore, commercial drying of heavy segregation redwood has required 6 to 12 montths of air drying followed by 6 to 20 days of kiln drying. With the disclosed process the air drying requirement is eliminated and the period of kiln drying is reduced to the range of from 1 to 10 days. Kiln drying time is dependent upon the initial temperature of the wood when put into the kiln and the operating characteristics of the kiln. The relative humidity is maintained at the minimum obtainable with the available equipment.

The invention is further illustrated by the following examples.

EXAMPLE 1

The drying process was carried out on a laboratory scale using a one inch thick California redwood board. The board has a moisture content between 180% and 190%. End matched samples were cut from the board. A coating was applied to the end grain of both samples so that moisture loss during drying would take place primarily from the side grain. Both samples were then individually wrapped in plastic film in order to maintain them at their existing moisture content. One of the samples was placed in a household freezer maintained at a temperature of approximately −5° F. (−20° C.) and left there for two days. The other sample, which served as a control, was stored in a household refrigerator at about 38° to 40° F. (4° C.) for the same length of time.

Both samples were removed from the respective units at the same point in time and while still wrapped in plastic film were exposed to normal room temperature of approximately 75° F. (24° C.) for about 24 hours. At this time the plastic film was removed from the samples, which were then weighed to establish that essentially no weight loss had taken place for either sample.

Both samples were then dried in a forced air circulation laboratory oven at a temperature of approximately 260° F. The samples were dried for 24 hours at which time they had reached constant weight and were removed from the oven. Less drying time is required for small samples than for larger masses of lumber.

There was a visible external difference in the two samples after drying. The large drying surfaces of the control sample which was not frozen exhibited the sunken appearance of collapsed wood. Upon closer comparison with the prefrozen sample, the control was also noticeably smaller in cross section. A dramatic difference in the two samples was immediately apparent when comparison was made of their cross cut surfaces. The untreated control sample had several of the lenticular shaped ruptures in the interior of the piece. The matched sample which was pretreated by freezing had more nearly its original cross section both in dimension and geometry and the wood in the interior of the piece had not been ruptured. No visible degrade was observed as the result of the accelerated drying of the prefrozen redwood sample.

EXAMPLE 2

A further laboratory test was made with a heavy segregation California redwood board taken directly off the green chain of the Simpson Timber Company sawmill at Korbel, California. This board was somewhat greater than two inches in thickness and its moisture content was approximately 250%. End matched samples were cut from this board and subjected to accelerated drying as in the previous example. The samples were individually wrapped in plastic film to prevent moisture loss during the pretreatment. One was frozen in a household freezer for about three days, during which time the other control sample was stored in a refrigerator. Both were returned to normal room temperature over a period of one day. Both were dried in a forced air circulation oven maintained at a temperature of about 220° for a drying time of about 48 hours. Results similar to Example 1 were obtained. The unfrozen control sample exhibited evidence of severe collapse and shrinkage. The pretreated frozen sample showed significantly less evidence of deterioration due to accelerated drying and more nearly maintained its original dimensions than did the control.

The results of other accelerated drying experiments are summarized in the accompanying table.

| Ex. No. | Wood Species | Green Moisture Content | Freezing Conditions | | Drying Conditions for Control and Prefrozen | | Remarks | |
|---|---|---|---|---|---|---|---|---|
| | | | Temp., ° F. | Time | Temp., ° F. | Time | Controls | Prefrozen |
| 3 | Black Walnut | 28% (Partially dried). | −13° F | 16 hrs | 140° dry bulb<br>165° dry bulb<br>180° dry bulb to 6% moisture. | 60 hrs<br>8 hrs<br>20 hrs | 0 No drying defects. | No drying defects. Volumetric shrinkage 24% less than for the controls. |
| 4 | Incense Cedar | Not determined. | To thorough freezing of liquid fraction of wood. | | 212° to 0% moisture. | | Severe collapse and honeycomb. | Slight collapse and honeycomb. Shrinkage reduced. |
| 5 | Tan oak [1] | do | −13° F | 40 hrs | 125° F., 70% 70R.H.<br>125° F., 0% 0R.H.<br>215° F., to oven dry condition. | 8 days<br>12 days<br>4 days | do | Collapse and honeycomb reduced. Volumetric shrinkage 15% less than for the controls. |
| 6 | California redwood. | 174.3% | −13° F | 2 days | 190° F., 0% R. H. to 2.2% average moisture. | 69 hrs | Severe collapse and honeycomb. | Slight collapse and no honeycomb. (Material very collapse susceptible as evidenced from behavior of the controls.) |
| 7 | do | 170.1% | −13° F | do | 190° F., 0% R. H. to 9.5% average moisture. | 44 hrs | do | Do. |
| 8 | do | 159.5% | −13° F | do | 190° F., 0% R. H. to 4.2% average moisture. | 44 hrs | No evidence of collapse. | No evidence of collapse. Thickness shrinkage 30% less than for the controls. |
| 9 | do | 91.6% | −13° F | do | 190° F., 0% R. H. to 6.7% average moisture. | 69 hrs | Severe collapse | Slight collapse. |
| 10 | do | 155% | 0° F | do | 110–115° F. Forced air oven; no humidity control. | Less than 2 days to 0% moisture. | Very severe collapse. | Moderate collapse. |
| 11 | do | 122% | −19° F | do | do | do | Moderate collapse. | Slight collapse. |
| 12 | do | 125% | −94° F | do | do | do | Severe collapse | Do. |
| 13 | do | 65–150% | −17° F | do | 175° F. R.H. 65% to 7.55% average moisture. | 143 hrs | Moderate to severe collapse in all 8 control boards. Percent shrinkages to approximately 8% M. C. Width: 4.34. Thickness: 6.73. | Slight collapse in but 2 of the 8 prefrozen boards. Percent shrinkages to approximately 8% M.C. Width: 2.61. Thickness: 3.46. Width, 40% less than controls. Thickness, 49% less than controls. |
| 14 | do | 65–150% | −17° F | do | 150° F., R.H. 65% to 5.46% average moisture. | 306 hrs | Collapse in 6 of the 8 control boards. Percent shrinkage to approximately 8% M. C. Width: 2.78. Thickness: 4.58. | No collapse in any of the 8 prefrozen boards. Percent shrinkages to approximately 8% M.C. Width: 1.97. Thickness: 2.21. Width, 29% less than controls. Thickness, 49% less than controls. |
| 15a | do | About 200% | −13° F | 1 hr | 212° F., 0% R.H. | To oven dryness. | Three samples of 12 ruptured during freezing; overall reduced shrinkage as compared with samples prefrozen at 23° F. (−5° C.); little additional benefit from freezing for more than 8 hours at this temperature. All samples contained honeycomb; but honeycomb and collapse was visibly less for samples of 53.5 hours duration and more; reduction in shrinkage substantially less than when prefreezing is at lower temperature. | |
| 15b | do | do | −13° F | 3 hrs | 212° F., 0% R.H. | do | | |
| 15c | do | do | −13° F | 7 hrs | 212° F., 0% R.H. | do | | |
| 15d | do | do | −13° F | 25 hrs | 212° F., 0% R.H. | do | | |
| 15e | do | do | −13° F | 49 hrs | 212° F., 0% R.H. | do | | |
| 15f | do | do | −13° F | 73 hrs | 212° F., 0% R.H. | do | | |
| 16a | do | do | −23° F | 5.5 hrs | 212° F., 0% R.H. | do | | |
| 16b | do | do | −23° F | 7.5 hrs | 212° F., 0% R.H. | do | | |
| 16c | do | do | −23° F | 11 hrs | 212° F., 0% R.H. | do | | |
| 16d | do | do | −23° F | 53.5 hrs | 212° F., 0% R.H. | | | |
| 16e | do | do | −23° F | 77.5 hrs | 212° F., 0% R.H. | do | | |

[1] Lithocarpus densiflorus.

Examples 3, 4, 5, 10, 11, 12, 15 and 16 report results obtained with comparatively small samples. In general the length of the samples along the grain ranged from about 11 inches on down to approximately 5 inches. Sample thickness was generally in the range of one to 1.5 inches while the width varied from about 2 to 6 inches. Drying was performed in forced air laboratory ovens without attempting to control the relative humidity.

In Examples 6, 7, 8, 9, 13 and 14 there was an attempt to make the experimental conditions simulate the industrial situation. Small board sized samples were employed, ranging in length from 2 to 4 feet. They were one inch thick and from 3 to 6 inches in width. These boards were always sawn as near to quartersawn as possible, and 2 coats of end coating were applied just prior to kiln drying. The experimental allocation of material allowed a face matched control board for each prefrozen board.

The boards were dried in a 1000 bd. ft. capacity Standard dry kiln equipped with a Foxboro recorder-controller. It is steam heated and the vapor is supplied in the form of live steam. The direction of air circulation within the kiln is automatically reversed every 12 hours.

It is in the field of economics that an industrial procedure receives the supreme test, and it is in the area of cost reduction that the process of this invention can make its most significant contribution.

Under existing technology kiln drying heavy segregation redwood from the green condition is not economically competitive with the procedure of air drying followed by kiln drying. Kiln drying green lumber in 27 days to an average moisture content of about 8% costs an estimated $21.65 per 1000 bd. ft. The minimum cost for air drying California redwood followed by kiln drying is $14.58 per M bd. ft., based on data taken from the report by Resch and Ecklund, supra. This assumes 300 days as the average time in the air drying yard and 3 cents per day as the drying yard cost per M bd. ft. The cost of transporting by large fork lift the lumber to and from the air drying yard is estimated to be approximately 60 cents per M bd. ft. for the round trip. The air seasoning cost thus amounts to $9.60 and the remaining amount of $4.98 is attributable to kiln drying. Kiln drying cost per day for a M bd. ft. is about 80 cents. This means that under optimum drying conditions approximately six days of kiln drying are required for lumber that has been air dried for 10 months.

Prefrozen redwood in many cases can be kiln dried from the green condition in a period of less than seven days. Thus, the minimum saved in drying costs is that achieved through the elimination of air drying. This amounts to an initial saving of approximately $10.00 per M bd. ft. dried. The difference between the cost of operation of freezing chambers and the eliminated air drying cost represents the basic savings to the industry. Other savings can be achieved. The reduced shrinkage of the prefrozen material means that the lumber can be cut thinner from the log. This results in a higher log yield. The heat removed during the freezing treatment may be utilized as a portion of that heat required in the kiln.

There are additional areas of potential saving which are difficult to quantify in terms of dollars. Most important is the elimination of the inevitable degrade that occurs under existing practice. During 10 months of air drying considerable contamination of the stacks from sawmill smoke and dust takes place, and the stacks are surface wetted frequently by the numerous rains in the redwood region. The net result is that much of the material when surfaced has to be dropped to the next lower grade due to the presence of a stain on the lumber. There is an approximate 3.5 percent loss in value during the air drying operation.

Also, the stacks are generally brought in for kiln drying when the average moisture content of the stacks is about 45%. The redwood tree population is subject to the same individual variation present in other biological populations, and consequently many of the individual boards in the air drying stack have a moisture content far removed from the average. Those at the high end of the range are likely to collapse when exposed to the conditions designed to dry material at a moisture content of 45%. Consequently a certain number of boards are lost during kiln drying of the previously air dried material.

Another potential area for saving is that of the light segregation which is presently kiln dried from the green condition. Prefreezing this material enables a significant reduction in the drying time and a reduction in the shrinkage.

An important advantage derives to the industry from the process of this invention in terms of greater flexibility to market changes, and in effect "bringing the market closer to the saw."

The elimination of air drying yards, which by necessity are located close to the sawmill, would release a large land area for other possible uses.

A very rough and perhaps conservative estimate of total annual direct saving to the redwood industry as a result of using the described process would be measured in millions of dollars.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A method of accelerating the drying rate of lumber which is normally susceptible to damage if subjected to rapid drying at elevated temperatures and upgrading the lumber by minimizing occurrence of collapse and honeycombing and reducing shrinkage, which method [comprises] *consists essentially of*

(A) pretreating lumber [in green condition] *above 30% moisture content* by subjecting to freezing conditions *below about 15° F.* to thoroughly freeze the liquid fraction therein, [and then]

(B) *thawing at least a substantial portion of the pieces of said lumber at ambient temperature conditions,*

(*C*) rapidly drying the [prefrozen] *pretreated* lumber *down to about 30% moisture content* by subjecting to conditions *of accelerated drying* of high temperature above the critical temperature at which damage normally occurs and low relative humidity, *and then continuing accelerated drying until the average moisture content has been reduced to about 8 to 10%.*

2. A method of drying according to claim 1 further characterized in that said lumber *is redwood and* is pretreated by subjecting to a temperature [of below] *between* about 15° F. [(−10° C.)] *and −15° F.* for a period of [at least] about eihgt hours.

[3. A method of drying according to claim 1 further characterized in that said lumber is maintained under high temperature conditions for a period of time until the average moisture content has been reduced to about 8 to 10%.]

[4.] *3.* A method according to claim 1 further characterized in that the lumber is redwood having an initial moisture content in excess of about 30% and said lumber is dried *down to about 30% moisture content* at a temperature in excess of the critical temperature range of 110 to 120° F. at which collapse can normally occur.

[5.] *4.* A method according to claim [4] *3* further characterized in that said lumber is dried at a temperature in the range of about 150° F. to 300° F. for from one to ten days.

References Cited

The following references, cited by the Examiner, are of record in the patented file of this patent or the original patent.

(References on following page)

UNITED STATES PATENTS

| | | | |
|---|---|---|---|
| 488,967 | 12/1892 | Haskin | 34—13.4 |
| 1,050,151 | 1/1913 | Loomis | 34—13.4 |
| 1,511,400 | 10/1924 | Daly | 34—13.4 |
| 1,593,598 | 7/1926 | Redman | 34—13.4 |
| 2,146,902 | 2/1939 | Martin | 34—5 |
| 2,463,782 | 3/1949 | Leischner | 34—13.4 |
| 2,534,714 | 12/1950 | Hoffman | 34—5 |
| 3,283,412 | 9/1966 | Farnsworth | 34—5 |

WILLIAM J. WYE, Primary Examiner

U.S. Cl. X.R.

34—134

PO-1050
(5/69)

UNITED STATES PATENT OFFICE
CERTIFICATE OF CORRECTION

Patent No. RE 27,124 Dated May 18, 1971

Inventor(s) Robert W. Erickson

It is certified that error appears in the above-identified patent and that said Letters Patent are hereby corrected as shown below:

Column 3, line 73, "montths" should be --months--.

In the Table, under the column "Drying Conditions for Control and Prefrozen - Temp., ° F." for the wood species tan oak,
"125° F., 70% 70 R.H.
125° F., 0% OR.H." should be
--125° F., 70% 70 R.H.
125° F., 0% R.H.--

Column 8, line 53, "eihgt" should be --eight--.

Signed and sealed this 21st day of September 1971.

(SEAL)
Attest:

EDWARD M.FLETCHER,JR.
Attesting Officer

ROBERT GOTTSCHALK
Acting Commissioner of Patents